(12) United States Patent
Johnson

(10) Patent No.: US 8,976,446 B2
(45) Date of Patent: Mar. 10, 2015

(54) EFFICIENT EXTENDED SHIFT MONOLITHIC RAMAN FIBER LASER

(71) Applicant: BAE Systems Information and Electronic Systems Integration Inc., Nashua, NH (US)

(72) Inventor: Benjamin R. Johnson, Nottingham, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 106 days.

(21) Appl. No.: 13/868,196

(22) Filed: Apr. 23, 2013

(65) Prior Publication Data

US 2013/0335812 A1    Dec. 19, 2013

Related U.S. Application Data

(60) Provisional application No. 61/661,620, filed on Jun. 19, 2012.

(51) Int. Cl.
   *G02F 1/35* (2006.01)
   *H01S 3/30* (2006.01)
   *H01S 3/08* (2006.01)

(52) U.S. Cl.
   CPC ............ *H01S 3/302* (2013.01); *H01S 3/08059* (2013.01)
   USPC .............................................. 359/327; 372/6

(58) Field of Classification Search
   None
   See application file for complete search history.

(56) References Cited

U.S. PATENT DOCUMENTS

| | | | |
|---|---|---|---|
| 4,039,851 A * | 8/1977 | Jain et al. ................... 359/327 |
| 4,838,638 A | 6/1989 | Kamiyama et al. |
| 4,919,511 A | 4/1990 | Ohsawa |
| 5,029,976 A | 7/1991 | Goto |
| 5,181,211 A | 1/1993 | Burnham et al. |
| 5,199,097 A | 3/1993 | Shinokura et al. |
| 5,285,309 A | 2/1994 | Endoh et al. |
| 5,400,173 A | 3/1995 | Komine |
| 5,815,518 A | 9/1998 | Reed et al. |
| 6,163,552 A | 12/2000 | Engelberth et al. |
| 6,163,554 A | 12/2000 | Chang et al. |
| 6,335,943 B1 | 1/2002 | Lorraine et al. |
| 6,431,732 B1 | 8/2002 | Brown et al. |
| 6,813,429 B2 | 11/2004 | Price et al. |
| 6,833,945 B2 | 12/2004 | Fukumoto |
| 7,633,673 B1 | 12/2009 | Islam |

(Continued)

*Primary Examiner* — Hemang Sanghavi
(74) *Attorney, Agent, or Firm* — Daniel J. Long; Global IP Services, PLLC; Prakash Nama

(57) ABSTRACT

A system and method for producing Stimulated Raman Scattering (SRS) is disclosed. A single optical fiber or Raman oscillator is optically pumped by a pump laser of sufficient power to generate SRS to generate several Stokes shifts of energy. This generates a multi-wavelength output or a single wavelength with several stokes energy shifts from the pump wavelength. A selective, monolithic-coated Raman fiber oscillator laser is utilized to increase the efficiency of frequency shifting by providing frequency-specific feedback at both facets of a free space coupled optical fiber oscillator. Frequencies that lie several bands away from the primary pump frequency may be efficiently achieved in a fiber oscillator by re-circulating the required stokes-shifted frequencies via selective high-reflection coatings. By re-circulating the intra-band stokes frequencies, the required intensities in each respective frequency will be increased, thereby dropping the respective Raman threshold in the optical fiber.

7 Claims, 5 Drawing Sheets

(56) References Cited

U.S. PATENT DOCUMENTS

| | | |
|---|---|---|
| 2002/0131157 A1 | 9/2002 | Ju et al. |
| 2004/0179797 A1* | 9/2004 | Po et al. ......................... 385/123 |
| 2007/0147757 A1* | 6/2007 | Shaw et al. ................... 385/125 |
| 2008/0259969 A1* | 10/2008 | Piper et al. ........................ 372/3 |

* cited by examiner

EFFICIENT EXTENDED SHIFT MONOLITHIC RAMAN FIBER LASER

CROSS-REFERENCE TO RELATED/APPLICATIONS

This Application claims rights under 35 USC §119(e) from U.S. Application Ser. No. 61/661,620 filed 19 Jun. 2012 the contents of which are incorporated herein by reference.

TECHNICAL FIELD

Embodiments are generally related to optical fibers, Embodiments also relate to a system and method of producing Stimulated Raman Scattering (SRS). Embodiments additionally relate to a single optical fiber that is optically pumped to generate Stimulated Raman Scattering to generate a multi-wavelength output or a single wavelength several Stokes energy shifts from the pump wavelength.

BACKGROUND OF THE INVENTION

Stimulated Raman Scattering (SRS) is an inelastic scattering process where the energy of an optical "pump" wave is transferred into a co-propagating "signal" wave, or a Stokes wave, within a gain medium. The total exchange of energy from the pump to the Stokes wave is material dependant, and is known as a Stokes shift. These gain mediums for SRS are often optical fibers and can be of any geometric, polarization, or index profile configuration. The threshold for the Raman process is a function of the inherent Raman gain and the geometry of the medium and the optical intensity of the pump wave. The generalized equation for the Raman threshold in an optical fiber can be described by $P_{th}=(16 A_{EFF})/G_r L_{EFF}$. This is a well known equation established by Agrawal in Nonlinear Fiber Optics that describes the amount of peak power, with particular optical fiber geometries, required to achieve equal power distribution between the pump and the Stokes waves. When sufficient energy is transferred from the pump wave to the Stokes wave, the Stokes wave can serve as the pump for a secondary Raman process. This process continues as all waves propagate down the length of the optical fiber. Depending on the length of the fiber, the process can cascade out to many Stokes frequency shifts.

This application leverages claims found in U.S. Pat. No. 7,340,136, wherein a Raman laser/oscillator utilizing at least three pairs of reflectors is claimed. This patent does not explicitly claim the exact method of reflection that is used in the oscillator, and the patent only gives Fiber Bragg Gratings (FBG's) as example reflectors. FBGs are the primary method of reflection in fiber optics. The gratings are typically written into single mode, FBG performance varies greatly depending on modal content of the optical fiber. This makes FBGs difficult to engineer accurately and precisely for fibers with significant modal content. Very wide spectral bandwidths are difficult to achieve with a single FBG. A Dielectric coating is much less susceptible to angular and modal properties of a laser beam and can be designed for extremely wide bandwidths—realizing the use of a non-single-mode fiber for Raman lasers and amplifiers. The invention closes the gap between efficient, narrow, and broadband visible and infrared lasers using fiber optics and the need for high power visible and infrared sources.

There are currently no methods available in the commercial or academic sectors that provide efficient means to utilize the cascaded stimulated Raman scattering to convert a discrete pump wavelength to a specific desired wavelength without the extraneous conversion and significant emission of undesired intermediate frequencies that are required to achieve the final desired wavelength.

A need, therefore exists, to have more versatile, robust and efficient Raman lasers and amplifiers that can be achieved via standard laser architectures (solid-state, diode, fiber, dye or glass lasers), broadband emission of multiple wavelengths in conventional or unconventional laser frequencies, or broadband "white" light from a single fiber source.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for optical fibers.

It is another aspect of the disclosed embodiments to provide for a system and method of producing Stimulated Raman Scattering (SRS).

It is a further aspect of the disclosed embodiments to provide for a single optical fiber that is optically pumped to generate Stimulated Raman Scattering to generate a multi-wavelength output or a single wavelength several Stokes energy shifts from the pump wavelength.

The aforementioned aspects and other objectives and advantages can now be achieved as described herein. A selective, monolithic-coated Raman fiber oscillator/laser is utilized to increase the efficiency of frequency shifting by providing frequency-specific feedback at both facets of a free space coupled optical fiber oscillator. Frequencies that lie several bands away from the primary pump frequency may be efficiently achieved in a fiber oscillator by re-circulating the required Stokes-shifted frequencies via selective high-reflection coatings. By re-circulating the intra-band Stokes frequencies, the required intensities in each respective frequency will be increased, thereby dropping the respective Raman threshold in the optical fiber. This will allow the cascaded Raman process to occur in a significantly shorter length of fiber than what would be required without a monolithic architecture.

Multimode and other fibers which are unconventionally used for Raman lasers are allowed to be used for Raman lasers. The increased intra-cavity energy decreases the Raman threshold required for larger core fibers and overcomes the multi-mode limitations placed on such a system. This, in turn, decreases the overall fiber length which often becomes prohibitively long for efficient laser operation. This is particularly advantageous in systems where reliable free-space coupling be maintained with high fidelity in high stress environments, such as those on a military platform, requiring non-single-mode fiber geometries.

A fast, inexpensive, and efficient method is provided for feedback in fibers that are otherwise not conducive to the writing of fiber Bragg gratings. Many fibers for use in the mid-infrared range do not have established writing processes. These fibers are cost effectively used in Raman oscillator architectures generating radiation in the mid-infrared by bypassing the expense of grating development process.

An optical fiber is used in the generation of narrow or broadband light in the visible region. High power emission in the visible region can be difficult to achieve due to many material imitations and the lack of a direct lasing host, such as Er, Yb, Nd, Tm, etc. The lack of direct lasing materials drives many architectures to use free-space solid-state non-linear processes to generate the desired wavelengths. Reliably coupling the light back into single-mode fibers designed for use in the visible region is difficult at best due to the extremely small core sizes, Raman lasers designed to achieve unconventional visible wavelengths are not robust in demanding environments such as those experienced by military platforms. In accordance with disclosed embodiments, a multimode or a large mode area fiber is used to harness the non-linear fiber optic processes efficiently in the visible region, while at the same time maintaining very high efficiency, free-space coupling of high power laser light.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
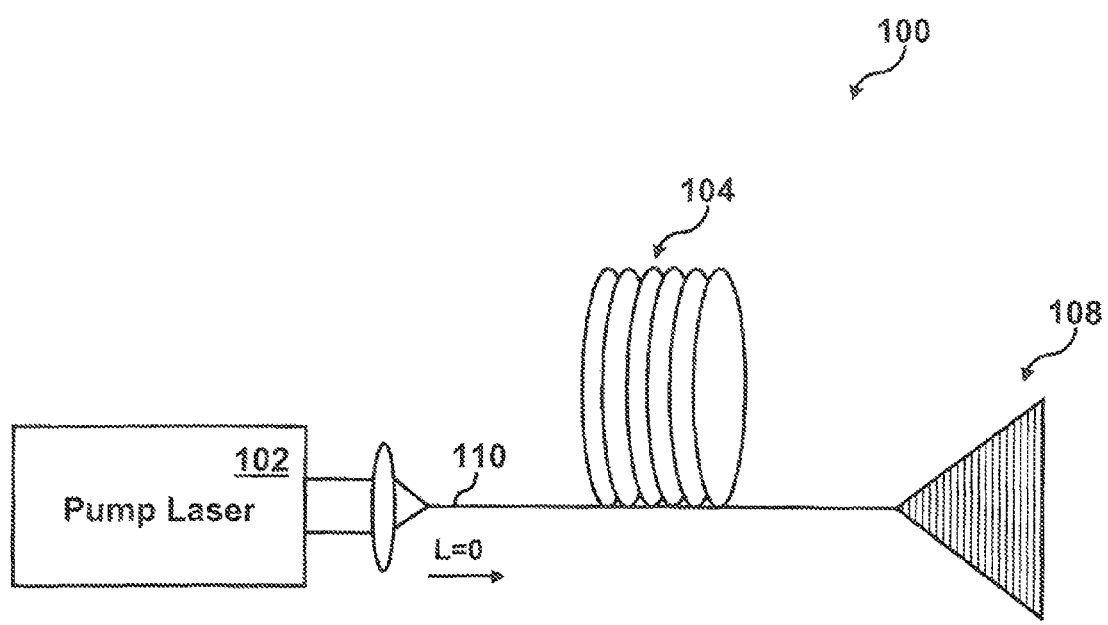
FIG. 1 illustrates a schematic diagram of a device for free space coupling of a pump laser into a Raman oscillator, in accordance with the disclosed embodiments.

Referring to FIG. 1, a schematic diagram of a device 100 for free space coupling of a pump laser 102 into a single optical fiber or Raman oscillator 104 is depicted. The device 100 has a single optical fiber or Raman oscillator 104 that is optically pumped by pump laser 102 of sufficient power to generate SRS which in turn generates several Stokes shifts of energy, thus a multi-wavelength output 108 is generated. The output 108 can also be a single wavelength with several Stokes energy shifts from the pump wavelength.

Note that the fiber 104 input is coated with a dielectric anti-reflector for the pump wavelength, a dielectric high reflector at the input and a high/partial reflector at the output of the optical fiber at the discrete stokes frequencies that lie between the pump and the desired output wavelength.

Figure 2:
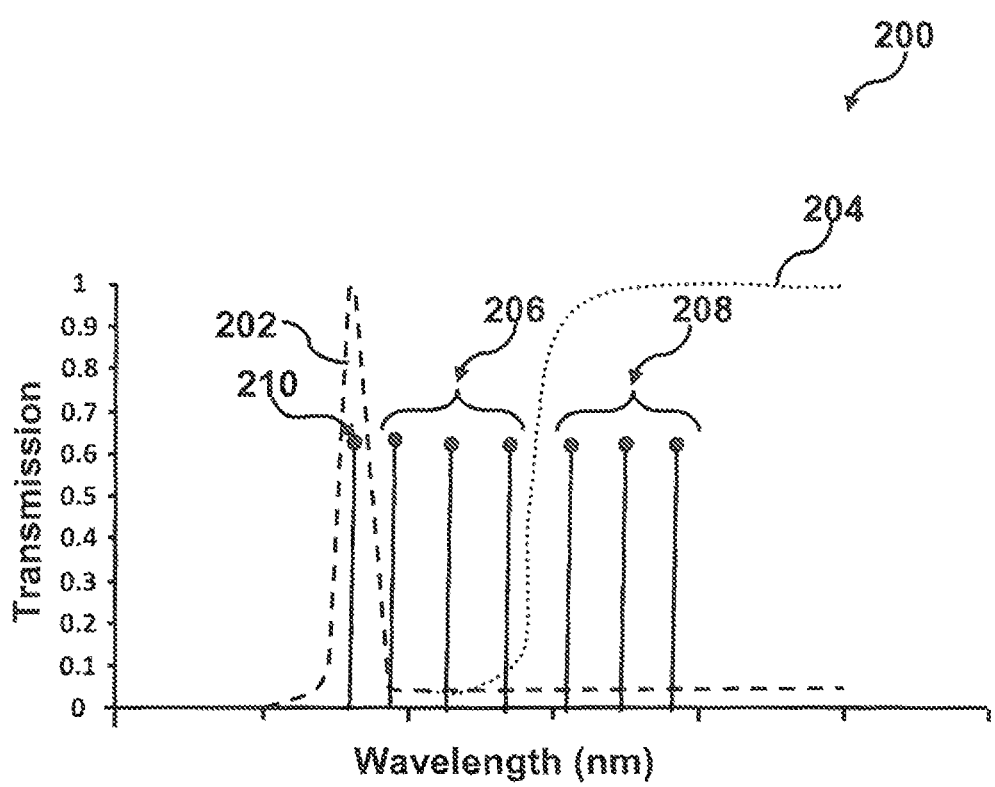
FIG. 2 illustrates a graph showing an example coating configuration for Raman oscillator designed to efficiently emit Stokes Shifts three through six, accordance with the disclosed embodiments.

The coating configuration for a Raman fiber oscillator/laser 104 that is designed to efficiently emit Stokes Shifts Three through Six is shown as graph 200 in FIG. 2. The input of the fiber 104 is coated with a dielectric high reflector at the desired output wavelength to prevent feedback into the pump source while the output is coated with a dielectric anti-reflector at the desired output wavelength. The input coating, output coating, first three Stokes shifts, Stokes shifts three through six and pump frequency are indicated by reference numerals 202, 204, 206, 208 and 210 respectively as shown in FIG. 2.

The fiber 104 is pumped with either a narrow or broadband laser source or pump laser 102 via free space coupling. The coating configuration on the optical fiber creates a monolithic oscillator cavity where sufficient intensities required to initiate SRS are achieved in a length of fiber that is exceptionally shorter than that required to achieve the same shift in a linear fiber. The oscillator cavity creates a condition where the SRS process essentially self seeds high order stokes shifts, thereby encouraging the energy transfer from the pump wave to the stokes wave in shorter length of fiber 104 than in a linear configuration.

Figure 3:
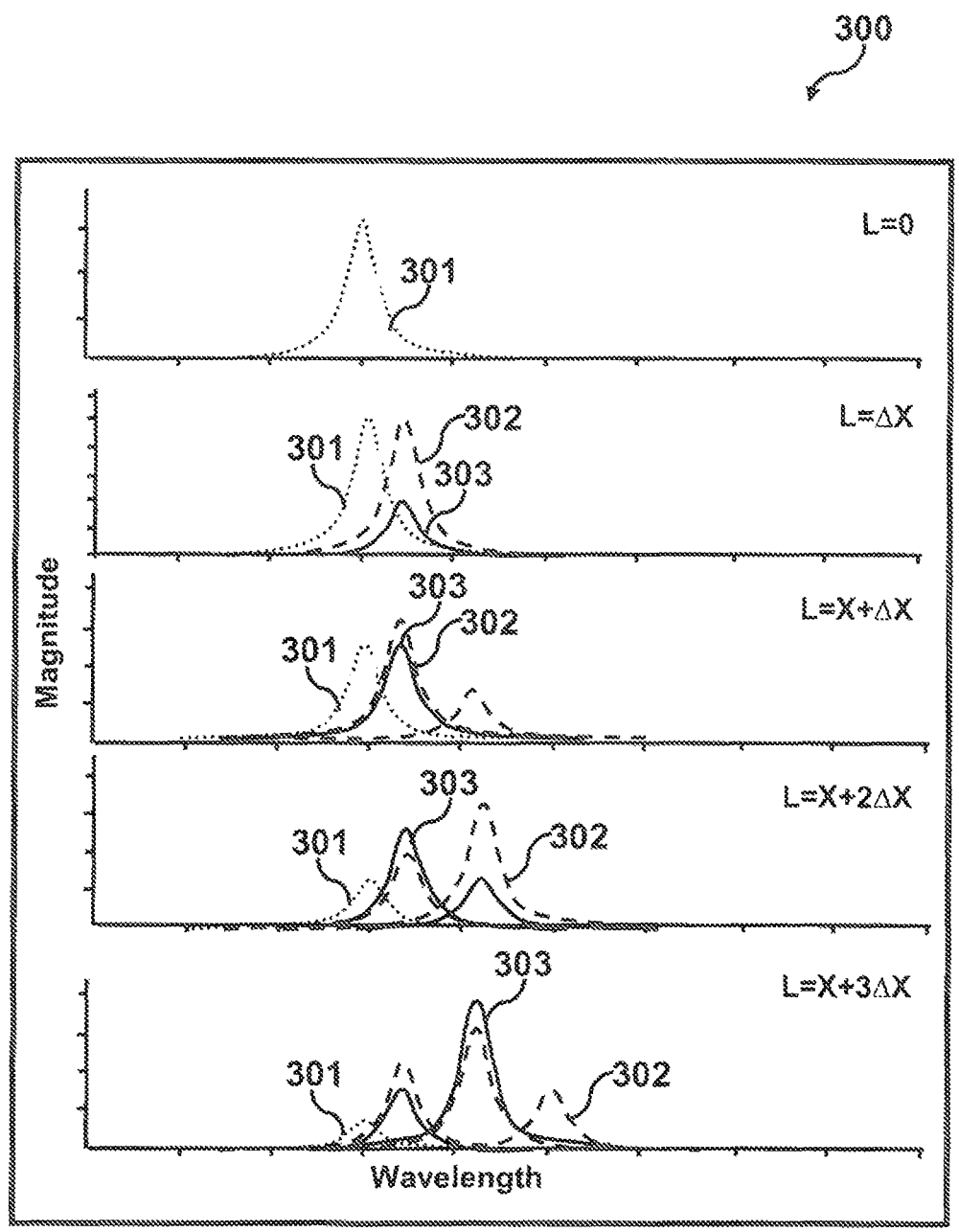
FIG. 3 illustrates a graph showing a comparison of spectral evolution along the Raman fiber for an oscillator and a linear fiber, in accordance with the disclosed embodiments.

The comparison of the oscillator and a linear fiber of spectral evolution along the Raman fiber is show as a graph 300 in FIG. 3. An increased shift in frequency and intensity as a function of position along the length L, in steps of $\Delta X$, of a fiber is shown in the FIG. 3. The energy comparatively transferred from the pump to the Stoke-shifted frequencies with reflectors versus without reflectors is shown in graph 300. The pump, pulse with reflectors and pulse without reflectors are indicated by reference numerals 301, 302 and 303 respectively.

Figure 4:
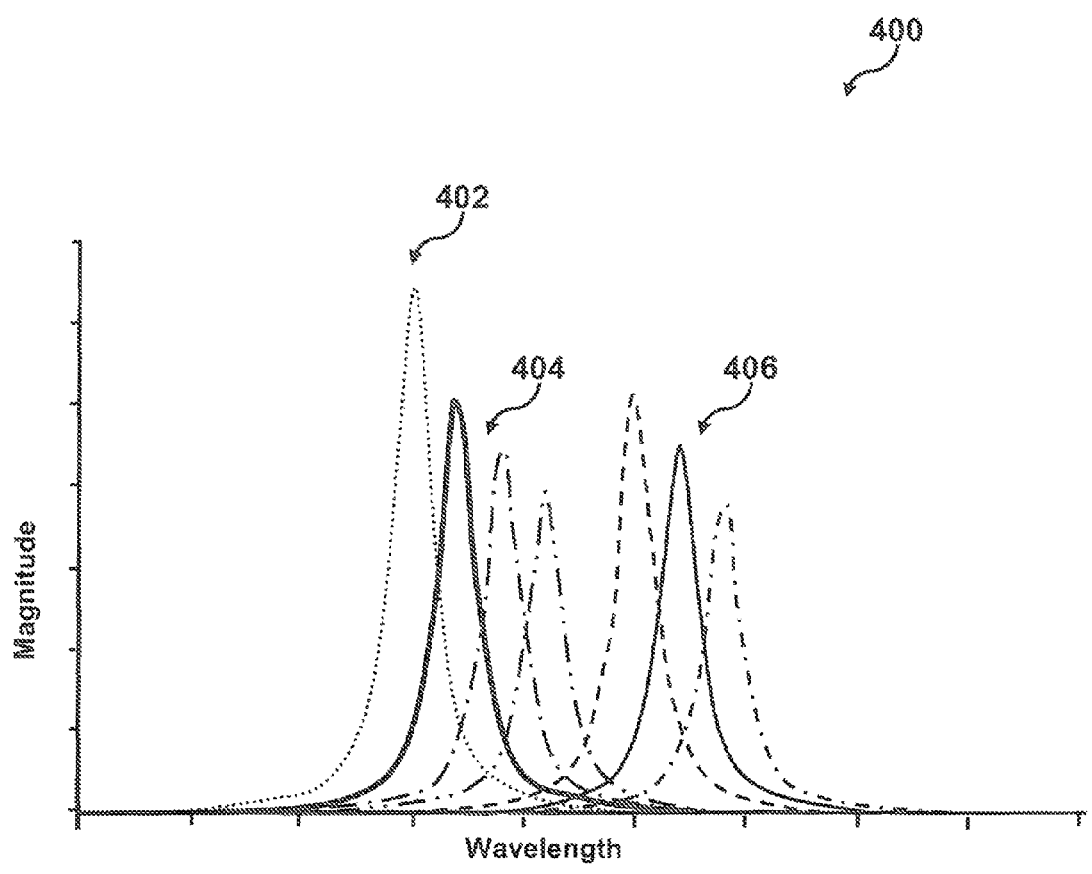
FIG. 4 illustrates a graph showing an example demonstration of further shifted energy for a given length of fiber, in accordance with the disclosed embodiments.

Referring to FIG. 4 as shown in graph 400, for a given length of fiber, radiation that is shifted further from the pump can be generated, than with a single pass linear configuration, while avoiding the losses associated with the extraneous fiber required to generate those energy shifts. The input spectrum, output spectrum without reflectors and output spectrum with reflectors are indicated by reference numerals 402, 404 and 406 respectively in the graph 400.

Figure 5:
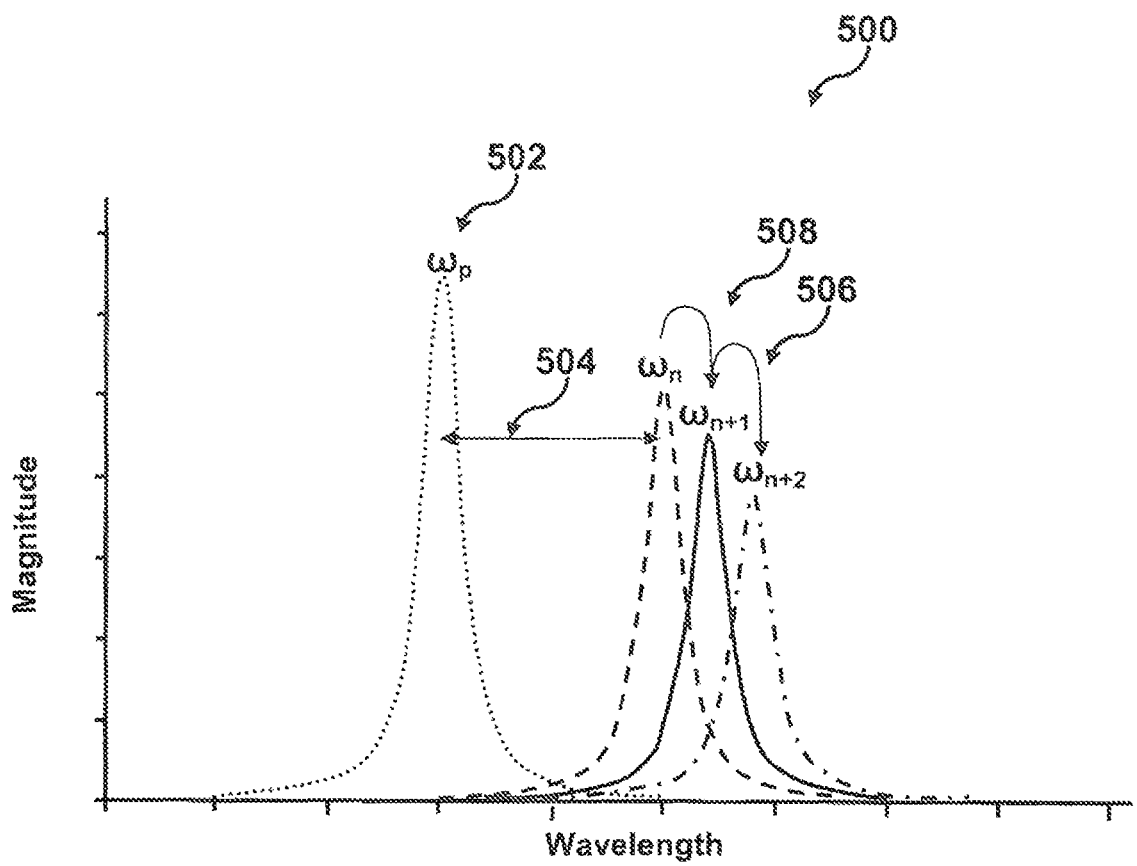
FIG. 5 illustrates a graph showing an example spectrum showing high order Stokes energy shifts, in accordance with the disclosed embodiments.

FIG. 5 illustrates a graph 500 showing an example spectrum showing high order Stokes energy shifts, in accordance with the disclosed embodiments. The input spectrum, frequency shifted energy transfer, cascaded stokes shifts and output spectrum are indicated by reference numerals 502, 504, 506 and 508 respectively.

The efficiency of the cascaded Raman process is greatly increased due to shorter fiber lengths in the laser (decreasing total fiber loss), and is essentially limited by the unavoidable quantum efficiency loss of energy transfer from the pump to the desired Stokes shifts. Aside from the increase in efficiency, the emission spectra of the oscillator are free of extraneous intra-band frequencies required to achieve the final desired frequency or frequencies and are highly tunable according to the specific requirements of the laser.

The length optical fiber in the invention may be sized according to the pulse regime of the laser source. The optical fiber serves as the gain medium for the stimulated Raman process. The length of the gain medium can be sized to accommodate continuous waves, high repetition rates, synchronous pumps, or ultrafast sources due to the flexibility and high efficiency nature of the monolithic laser cavity structure of the invention. The laser pump source may be a solid-state, fiber, dye, diode, or gas laser that is free-space coupled into the gain medium.

In an alternate embodiment, higher level non-linear processes such as Cross-Phase Modulation (CPM), Self-Phase Modulation (SPM), Four-Wave Mixing (FWM) that interact with the SRS stokes shifts to create broadband, near super-continuum emission are also obtained. This process is realized significantly more efficiently by providing selective feedback that increases total intra-cavity energy, decreasing the threshold for SRS, CPM, SPM, and FWM.

A method of feedback for spectral regions that are unattainable by the use of FBGs (e.g., wavelengths shorter than roughly 700 nm) is provided. An accurate feedback in multimode fibers used for cascaded Raman processes is also provided. The use of multimode fibers implemented in a Raman laser is unconventional. However, their subsequent, efficient use allows for Raman lasers to be used on environmentally demanding applications such as those on military aircrafts. Efficient, free-space coupling of laser light into a larger core optical fiber is more easily achieved in those environments than that of a single mode fiber.

While the present invention has been described in connection with the preferred embodiments of the various figures, it is to be understood that other similar embodiments may be used or modifications and additions may be made to the described embodiment for performing the same function of the present invention without deviating there from. Therefore, the present invention should not be limited to any single embodiment, but rather construed in breadth and scope in accordance with the recitation of the appended claims.

What is claimed is:

1. A method for producing Stimulated Raman Scattering:
    pumping a laser beam to a single optical fiber, wherein said optical fiber is coated with a dielectric high reflector at input and a high or partial reflector at output at discrete stokes frequencies that lie between pump frequency and desired output wavelength;
    providing frequency-specific feedback at both facets of a free space coupled optical fiber oscillator, wherein required stokes-shifted frequencies are re-circulated via selective high-reflection coatings to achieve frequencies that lie a number of bands away from the pump frequency in the fiber oscillator; and
    generating a multi-wavelength output or a single wavelength several stokes energy shifts from pump wavelength.

2. The method of claim 1 wherein said optical fiber coating prevents feedback into a pump source.

3. The method of claim 1 wherein said optical fiber is used in the generation of narrow or broadband light in visible region.

4. The method of claim 1 wherein said optical fiber is pumped with either a narrow or broadband laser source via free space coupling.

5. The method of claim 1 wherein coating configuration on said optical fiber creates a monolithic oscillator cavity where sufficient intensities required to initiate SRS are achieved in a length of fiber.

6. The method of claim 5 wherein said oscillator cavity creates a condition where the SRS process essentially self seeds high order stokes shifts, thereby encouraging energy transfer from pump wave to stokes wave in shorter length of fiber.

7. The method of claim 1 wherein length said optical fiber is sized according to pulse regime of laser source.

* * * * *